United States Patent
Miyajima

(10) Patent No.: US 8,274,685 B2
(45) Date of Patent: Sep. 25, 2012

(54) IMAGE FORMING APPARATUS, METHOD AND STORAGE MEDIUM STORING CONTROL PROGRAM THEREFOR ALLOW TO SET A COMPOSITE SERVICE AND DETERMINE COMPOSITE SERVICE IS AVAILABLE WITH A COMBINATION OF A CONTROL PROGRAM

(75) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 12/395,397

(22) Filed: Feb. 27, 2009

(65) Prior Publication Data
US 2009/0296135 A1 Dec. 3, 2009

(30) Foreign Application Priority Data

Feb. 29, 2008 (JP) .................................. 2008-050129

(51) Int. Cl.
- G06F 3/12 (2006.01)
- G06F 9/44 (2006.01)
- G06F 9/445 (2006.01)
- G06K 15/00 (2006.01)
- H04N 1/00 (2006.01)

(52) U.S. Cl. ....... 358/1.15; 358/1.16; 358/1.6; 717/168; 717/170; 717/171; 717/172; 717/174

(58) Field of Classification Search .................. 358/1.15, 358/1.1, 1.16, 1.6, 508; 709/201, 208, 212, 709/213, 238, 245, 246; 717/168, 176, 174, 717/170, 171; 710/15, 17, 19, 100
See application file for complete search history.

(56) References Cited

U.S. PATENT DOCUMENTS

| | | | | |
|---|---|---|---|---|
| 7,312,883 | B2 * | 12/2007 | Nakamura et al. | 358/1.14 |
| 7,970,813 | B2 * | 6/2011 | Lum et al. | 709/201 |
| 2003/0149917 | A1 * | 8/2003 | Smith et al. | 714/38 |
| 2004/0061890 | A1 * | 4/2004 | Ferlitsch | 358/1.15 |
| 2004/0252331 | A1 * | 12/2004 | Wei | 358/1.15 |
| 2007/0014612 | A1 * | 1/2007 | Kim | 400/61 |

FOREIGN PATENT DOCUMENTS

| | | | |
|---|---|---|---|
| JP | 2000-298580 A | | 10/2000 |
| JP | 2002-099418 A | | 4/2002 |
| JP | 2003-209510 A | | 7/2003 |
| JP | EP1387268 | * | 2/2004 |

OTHER PUBLICATIONS

Masaki, Printer and Controlling Method Therefor, Oct. 24, 2000, Machine Translation Japanese Patent Publication, JP2000298580, all pages.*
Yoshiaki, Version up Method, Apr. 5, 2002, Machine Translation Japanese Patent Publication, JP2002099418, all pages.*

* cited by examiner

Primary Examiner — Benny Q Tieu
Assistant Examiner — Ngon Nguyen
(74) Attorney, Agent, or Firm — Canon U.S.A., Inc., IP Division

(57) ABSTRACT

An image forming apparatus to which a composite service that can cause a plurality of devices to collaborate can be set, and in which a currently used control program and an upgraded control program can be stored, includes a determination unit configured to determine whether the composite service is available with a combination of a control program for the image forming apparatus and a control program for another device, and an activation unit configured to activate the control program for the image forming apparatus if the determination unit determines that the other device is usable for the composite service.

6 Claims, 14 Drawing Sheets

FIG.11

| CLUSTER PRINTING SOFTWARE VERSIONS COMBINATION TABLE | | | |
|---|---|---|---|
| MODEL | VERSION | MODEL | VERSION |
| X | 1.0 | X | 1.0 |
| X | 1.1 | X | 1.1 |
| X | 2.0 | X | 2.0 |
| X | 2.0 | X | 2.1 |
| X | 2.0 | Y | 3.0 |

1101

| MODEL MANAGEMENT TABLE | |
|---|---|
| DEVICE A | X |
| DEVICE B | X |
| DEVICE C | Y |

1102

IMAGE FORMING APPARATUS, METHOD AND STORAGE MEDIUM STORING CONTROL PROGRAM THEREFOR ALLOW TO SET A COMPOSITE SERVICE AND DETERMINE COMPOSITE SERVICE IS AVAILABLE WITH A COMBINATION OF A CONTROL PROGRAM

BACKGROUND OF THE INVENTION

1. Field of the Invention

The present invention generally relates to an image forming apparatus, such as for example an apparatus including one or more of a copying machine, a printing apparatus, and a facsimile recording unit.

2. Description of the Related Art

A composite service conventionally exists in which image data input from a scanner is output as an image from printer units of a plurality of image forming apparatuses connected via a network. Such a service is referred to as cluster printing, and a cluster printing mode can be set in a conventional image forming apparatus.

For example, when a user is to print a large number of copies of a document, the user can select a cluster printing mode that enables cluster printing. The document can be printed by distributing a set number of copies to be printed to a plurality of image output apparatuses. As a result, the time for printing can be shortened compared to printing the set number of copies with one printer, so that productivity of image output can be improved.

When a plurality of devices collaborates to realize one function in such a composite service, a mismatched combination of control software may generate a nonconformity in protocols between devices. To prevent such a problem, it may be necessary to appropriately combine the control software between devices.

For example, in a cluster printing mode, nonconformity in protocols between devices may cause a color shift or disable a device to communicate with another device. Therefore, it may be necessary to have an appropriate combination of control software between the devices that realize the cluster printing mode.

On the other hand, current copying machines and printing apparatuses typically store control software in a rewritable medium such as a flash memory or a hard disk. As a result, the control software can be upgraded after shipment from a factory, so that copying machines and printing apparatuses may promptly respond to market needs.

Further, there is an increase in cases where new control software is speedily distributed to devices and upgraded via a network such as the Internet. However, in such cases, there is a risk that the combination of software for performing cluster printing that was appropriate at the time of installment may become inappropriate due to a subsequent upgrade of the software to answer market demands.

Japanese Patent Application Laid-Open No. 2002-099418 discusses solving such a problem in which the control software does not operate normally due to an upgrade. More specifically, Japanese Patent Application Laid-Open No. 2002-099418 discusses a system in which, in a case where there is data remaining in the device that can only be processed by a former version of the control software, the control software is not upgraded until the data is processed.

Further, Japanese Patent Application Laid-Open No. 2000-298580 discusses a method in which a device, whose control software is upgraded by a distribution server that distributes the new version of the control software, upgrades control software of another device that is connected to the device via a network.

Further, Japanese Patent Application Laid-Open No. 2003-209510 discusses a method for simultaneously distributing an update file to a plurality of devices.

SUMMARY OF THE INVENTION

According to an aspect of the present invention, an image forming apparatus to which a composite service that can cause a plurality of devices to collaborate can be set, and in which a currently used control program and an upgraded control program can be stored, includes a determination unit configured to determine whether the composite service is available with a combination of a control program for the image forming apparatus and a control program for another device, and an activation unit configured to activate the control program for the image forming apparatus if the determination unit determines that the other device is usable for the composite service.

According to another aspect of the invention, an image forming apparatus to which a composite service that can cause a plurality of devices to collaborate can be set, and in which a currently used control program and an upgraded control program can be stored, includes a determination unit configured to determine whether the composite service is available with a combination of the upgraded control program for the image forming apparatus and an upgraded control program for another device, and an activation unit configured to activate the upgraded control program for the image forming apparatus if the determination unit determines that the other device is usable for the composite service.

According to yet another aspect of the invention, an image forming apparatus to which a composite service that can cause a plurality of devices to collaborate can be set, and in which a currently used control program and an upgraded control program can be stored, includes a determination unit configured to determine whether the composite service is available with a combination of the upgraded control program for the image forming apparatus and a currently used control program for another device, and an activation unit configured to activate the upgraded control program for the image forming apparatus if the determination unit determines that the other device is usable for the composite service.

According to another embodiment of the invention, an image forming apparatus to which a composite service that can cause a plurality of devices to collaborate can be set, and in which a currently used control program and an upgraded control program can be stored, includes a determination unit configured to determine whether the composite service is available with a combination of a control program for the image forming apparatus and a control program for another device, and an activation unit configured to activate the currently used control program for the image forming apparatus if the determination unit determines that the composite service is not available with a combination of the upgraded control program for the image forming apparatus and an upgraded control program for the other device, and that the composite service is not available with a combination of the upgraded control program for the image forming apparatus and a currently used control program for the other device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 11 illustrates an example of a management table, which is used to determine whether cluster printing is available when the control software is upgraded.

DETAILED DESCRIPTION OF THE EMBODIMENTS

Various exemplary embodiments, features, and aspects of the invention will be described in detail below with reference to the drawings.

In an exemplary embodiment of the present invention, the cluster printing mode will be described as an example in which a plurality of devices realizes one function. The cluster printing mode is a composite service that enables a job to be performed by a collaboration of a plurality of devices. More specifically, the cluster printing function outputs a set number of copies by the collaboration of a plurality of devices.

An example of a collaboration of a plurality of image forming apparatuses will be described below in the exemplary embodiment. According to one aspect of the invention, devices such as at least one of a multifunction peripheral (MFP), an apparatus that realizes a part of a function of the MFP (such as a post-processing apparatus), a copying machine, a printing apparatus, a facsimile, and a printer (e.g., a laser beam printer) can be devices that work together.

Figure 1:
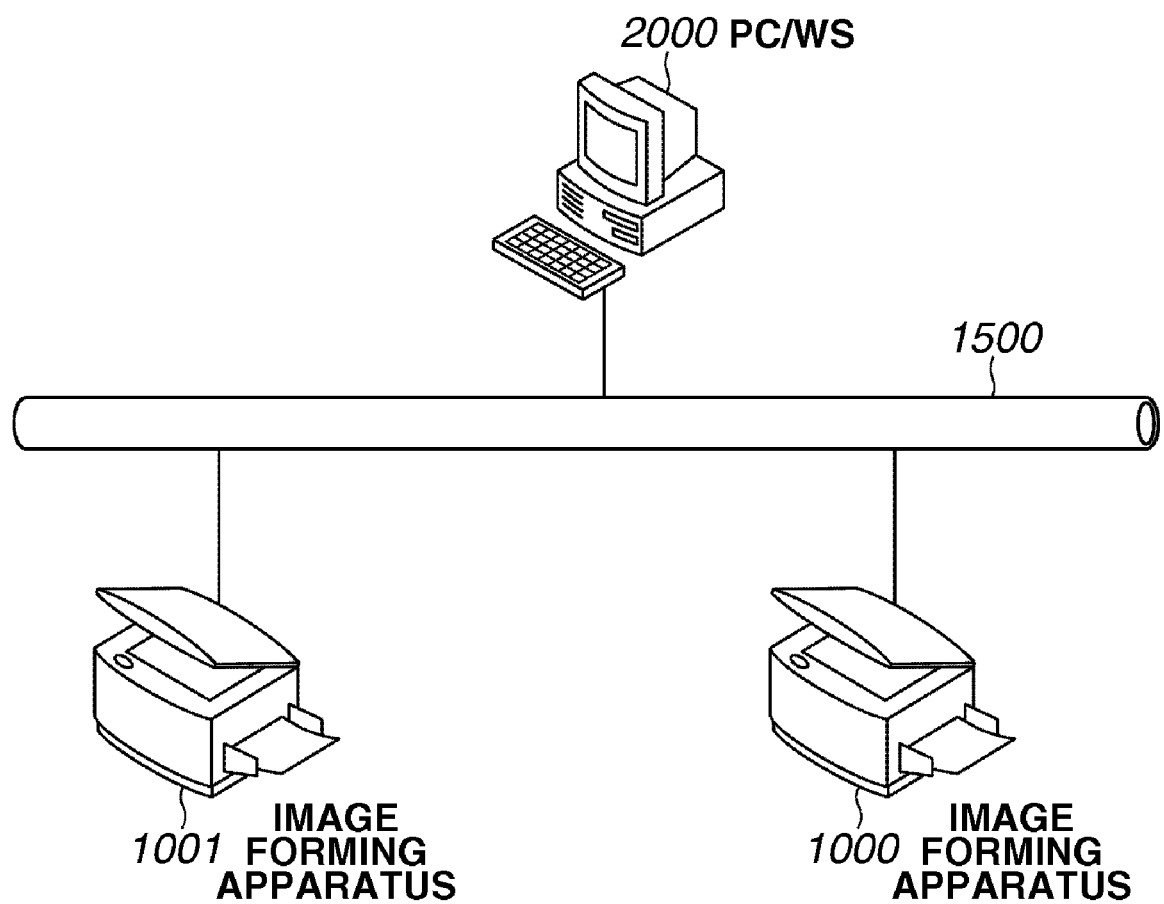
FIG. 1 illustrates a configuration of a system according to an exemplary embodiment of the present invention.

FIG. 1 illustrates a system configuration according to a first exemplary embodiment of the present invention. Referring to FIG. 1, an image forming apparatus 1000 and an image forming apparatus 1001 are connected via a network 1500. The image forming apparatus 1000 and the image forming apparatus 1001 are usable for cluster printing.

For example, when the user is to print 500 copies on the image forming apparatus 1000 using a cluster print setting, the same image data is transferred to the image forming apparatus 1001. The image forming apparatus 1000 and the image forming apparatus 1001 then divide the number of copies and output 250 copies each, so that the time for printing can be shortened as compared to printing on only one image forming apparatus.

The cluster printing function may be realized by collaboration between the image forming apparatus 1000 and the image forming apparatus 1001. However, if control software of one of the image forming apparatuses is upgraded, it can occur that the cluster printing function may become unusable.

The control software of the image forming apparatus 1000 and of the image forming apparatus 1001 may be upgraded by transmitting new control software from, for example, a personal computer (PC) or a work station (WS) (PC/WS) 2000, to the image forming apparatus 1000 and the image forming apparatus 1001 via the network 1500.

Figure 2:
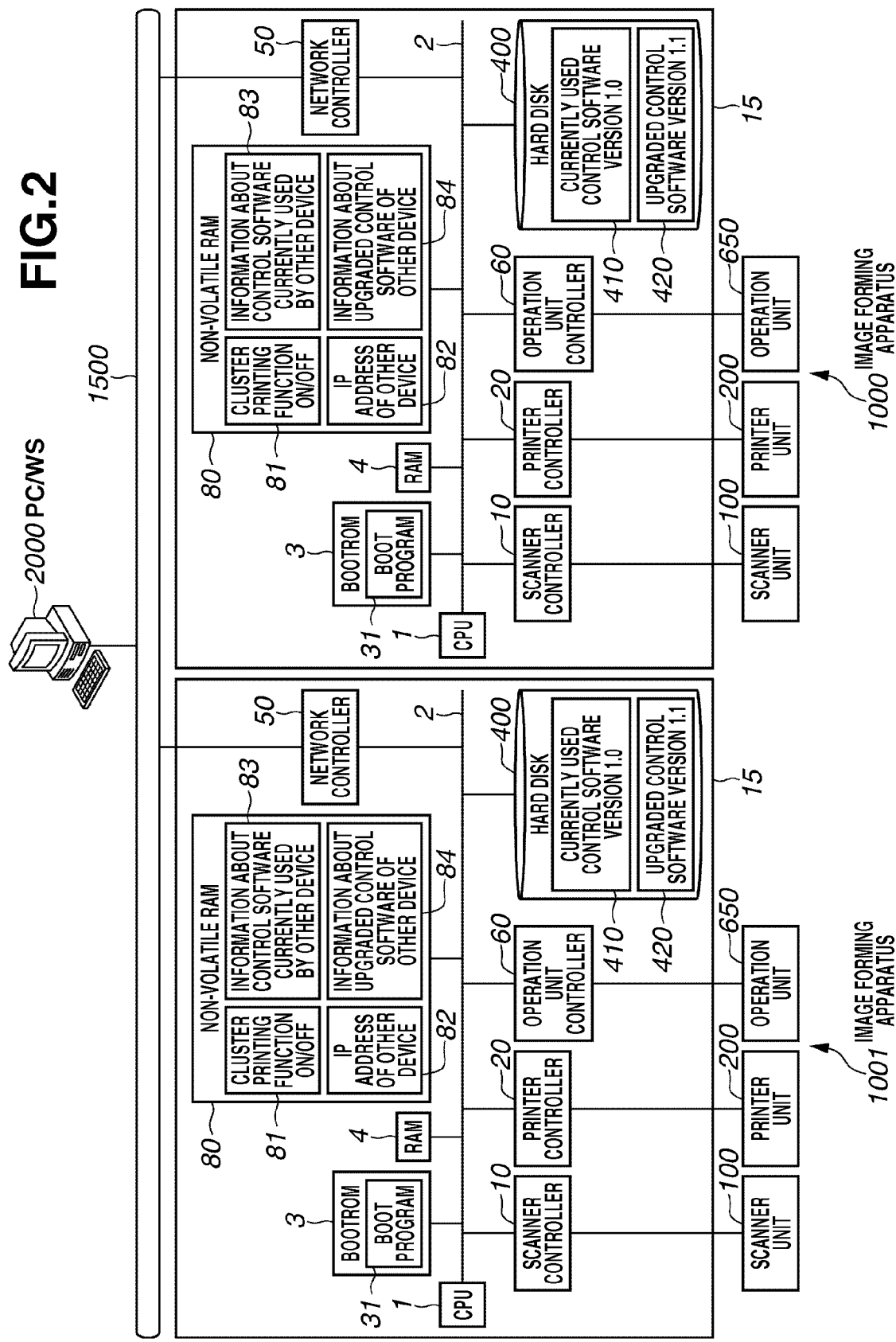
FIG. 2 is a block diagram illustrating a configuration of an image forming apparatus according to an exemplary embodiment of the present invention.

FIG. 2 is a block diagram illustrating a configuration of the control unit 15 in the image forming apparatus 1000 and a control unit 15 in the image forming apparatus 1001 according to the present exemplary embodiment.

Referring to the embodiment shown in FIG. 2, the control unit 15 in the image forming apparatus 1000 and the control unit 15 in the image forming apparatus 1001 are connected to the network 1500 via a network controller 50. The control unit 15 according to this embodiment includes a central processing unit (CPU) 1, a boot read-only memory (ROM) 3, a random access memory (RAM) 4, a non-volatile RAM 80, the network controller 50, a scanner controller 10, a printer controller 20, an operation unit controller 60, and a hard disk drive (HDD) 400. The above-described components are connected by a system bus 2.

The CPU 1, which controls the entire operation of the control unit 15, operates based on a boot program 31 read from the boot ROM 3. Further, the CPU 1 may execute a program stored in the HDD 400 that corresponds to a process illustrated in FIG. 5 described below. The RAM 4 is used as a work area for the CPU 1 to operate, or as an area for storing image data. Values can be retained in the non-volatile RAM 80 even when the power is switched off. Therefore, values such as contents of a setting that should be retained even when the power is switched off can be stored in the non-volatile RAM 80.

The network controller 50, which controls the network, is connected to an external network. An external computer such as the PC/WS 2000 is connected to the external network and exchanges data with the image forming apparatus 1000.

The scanner controller 10 connected to a scanner unit 100 is also connected to the CPU 1 via the system bus 2 according to this embodiment. The scanner controller 10 may include functions for performing an appropriate binarization, and scaling an image received from the scanner unit 100 in main scanning and subscanning directions, according to the content of the post-processing. Further, the scanner controller 10 may include a function for outputting control signals generated based on video control signals transmitted from a printer unit 200 to the system bus 2.

The printer controller 20 connected to the printer unit 200 is also connected to the CPU 1 via the system bus 2 according to this embodiment. The printer controller 20 may include a function for performing smoothing on the image data output from the CPU 1 and outputting the smoothed image data to the printer unit 200. Further, the printer controller 20 may include a function for outputting control signals generated based on video control signals transmitted from the printer unit 200 to the system bus 2.

Figure 3:
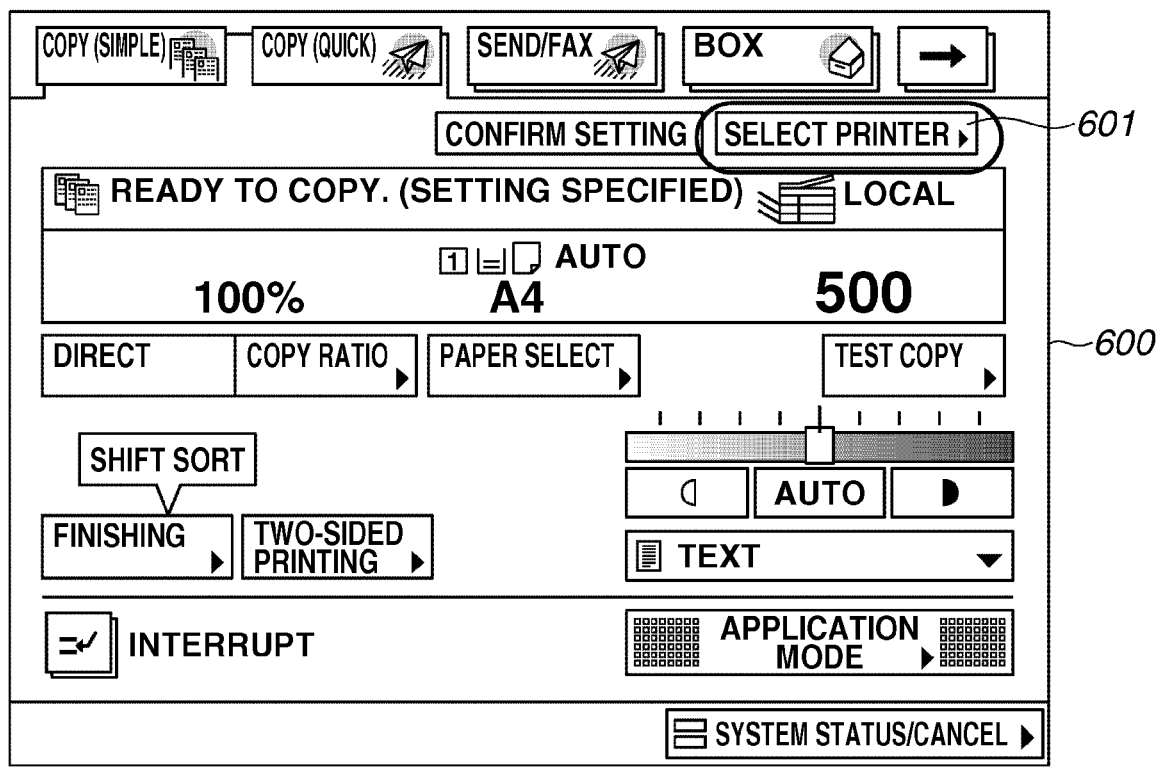
FIG. 3 illustrates an example of a screen for selecting a device in which a cluster printing mode is to be set, displayed on a touch panel input device on an operation unit of the image forming apparatus according to an exemplary embodiment of the present invention.

The operation unit controller 60 according to this embodiment is connected to an operation unit 650. FIG. 3 illustrates an example of a touch panel input device 600 attached to a liquid crystal display (LCD) unit of the operation unit 650 of the image forming apparatus according to the present exemplary embodiment. The operation unit 650 may also include a plurality of hard keys. The touch panel input device 600 may be used by the user to specify main mode settings and also displays the status. In one version, the user can set a cluster printing mode by pressing a printer selection button 601 on the touch panel input device 600.

A signal input via the touch panel input device 600 or the hard keys may be transmitted to the CPU 1 via the operation unit controller 60, and the LCD unit may display image data transmitted from the operation unit controller 60. The LCD unit can display functions and image data to be used in a user operation of the image forming apparatus.

Figure 4:
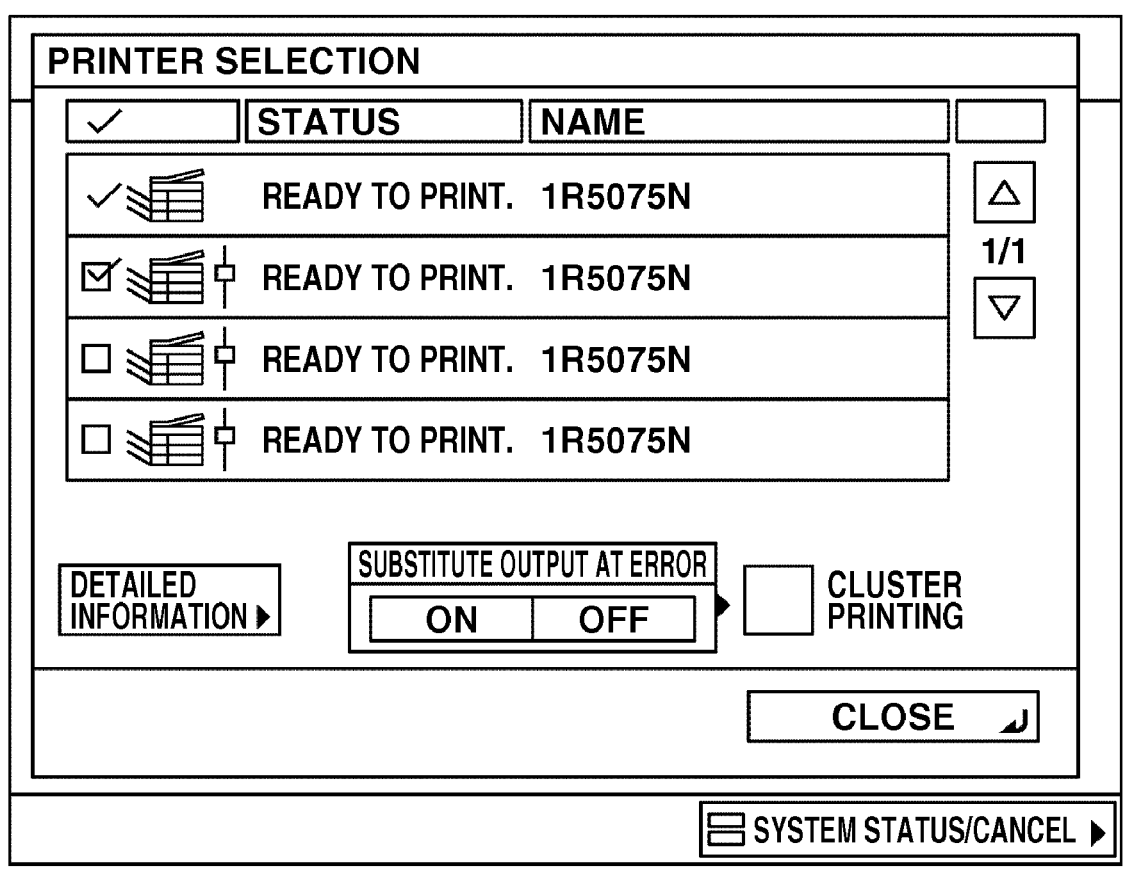
FIG. 4 illustrates an example of a screen displayed when a user presses a printer selection button on the screen illustrated in FIG. 3.

FIG. 4 illustrates an example of a screen displayed on the LCD unit when the user presses the printer selection button 601, in which image forming apparatuses usable for cluster printing on the network are displayed. Cluster printing can be performed by selecting one apparatus from among the displayed image forming apparatuses, to which the cluster printing mode can be set.

Returning to FIG. 2, programs and image data can be written and read into the HDD 400. The HDD 400 can store a plurality of control software. In the present exemplary embodiment, the HDD 400 may store a program that corresponds to the flowchart illustrated in FIG. 5. Further, the HDD 400 may store a management table used in determining whether a model of the image forming apparatus matches a version of the control software.

FIG. 11 illustrates an example of a management table used to determine whether the model matches the version of the control software. In the present exemplary embodiment, the management table includes a version combination table 1101 and a model management table 1102.

In the example illustrated in FIG. 11, device B and device C can be selected to perform cluster printing with device A. Further, it can be determined from the model management table 1102 that device A and device B are of the same model. Further, it can be determined from the version combination table 1101 that the cluster printing mode is available when the control software in the device A is version 1.0 and the control software in the device B is version 1.0.

Further, according to the model management table 1102, device A is of a model X and device C is of a model Y. Therefore, based on the version combination table 1101, the control software of the device A may be version 2.0 and the control software of the device C may be version 3.0 to use the cluster print mode in device A and device C.

The management table can be stored when upgraded control software Version 1.1 (420) is stored in the HDD 400 of the image forming apparatus 1000 or the image forming apparatus 1001. Further, the management table can be separately downloaded from a server and/or installed from an external storage device (e.g., at least one of HDD, CD-ROM, and DVD-ROM).

An example of an activation procedure of the control unit 15 will be described below.

According to this example, when the control unit 15 is switched on, the CPU 1 reads a boot program 31 from the boot ROM 3.

Since there is a limit on the capacity of the boot ROM 3, a large-scale multifunctional program may not be able to be stored in the boot ROM 3. Therefore, the control software stored in the HDD 400 may perform control of the scanner controller 10, the printer controller 20, the network controller 50, and the operation unit controller 60.

A program capacity of the boot program 31 can be reduced by the boot program 31 performing only the process of activating the control software in the HDD 400. The boot program 31 thus reads the contents of the non-volatile RAM 80, and control is performed by the control software in the HDD 400.

In the present exemplary embodiment, the image forming apparatus stores control software 410 and 420 as control programs. The currently used control software 410 is version 1.0, and the upgraded control software 420 is version 1.1.

Further, in the present exemplary embodiment, the control software version 1.1 (420) is a newer version compared to the control software version 1.0 (410). Further, it is supposed that the control software is to be upgraded from version 1.0 to version 1.1, and that cluster printing is not available with a combination of the control software version 1.0 and the control software version 1.1.

The boot program 31 stored in the boot ROM 3 activates the control software in the HDD 400 based on information in the non-volatile RAM 80. When there is a plurality of pieces of control software, the boot program selects and activates one of the pieces of control software.

An example of the internal structure of the non-volatile RAM 80 will be described below. The non-volatile RAM 80 can store information about a plurality of control programs. For example, cluster printing function ON/OFF information 81, Internet Protocol (IP) address of other device 82, version information of control software currently used by other device 83, and version information of upgraded control software in another device 84 may be stored in the non-volatile RAM 80. The "other device" or "another device" is a device in which the cluster printing mode is to be set, with the other device for the image forming apparatus 1000 being the image forming apparatus 1001, and the other device for the image forming apparatus 1001 being the image forming apparatus 1000.

The cluster printing function ON/OFF information 81 is an area for storing whether the cluster printing function is enabled. The IP address of the other device 82 is an area for storing the IP address of the other device that the image forming apparatus communicates with when the cluster printing function is switched on according to the cluster printing function ON/OFF information 81.

The version information of control software currently used by the other device 83 is an area for storing version information of the currently used control software 410 stored in the HDD 400 of the other device. Further, the version information of upgraded control software in the other device 84 is an area for storing a version of the upgraded control software 420 stored in the HDD 400 of the other device.

The image forming apparatus 1000 regularly communicates with the other device about version information of control software currently used by the other device 83 and the version information of upgraded control software in the other device 84, when the cluster printing function is enabled. Further, the version information of control software currently used by the other device 83 and the version information of upgraded control software in the other device 84 can be overwritten by information about the currently used control software 410 and the upgraded control software 420 in the HDD 400 of the other device.

Figure 5:
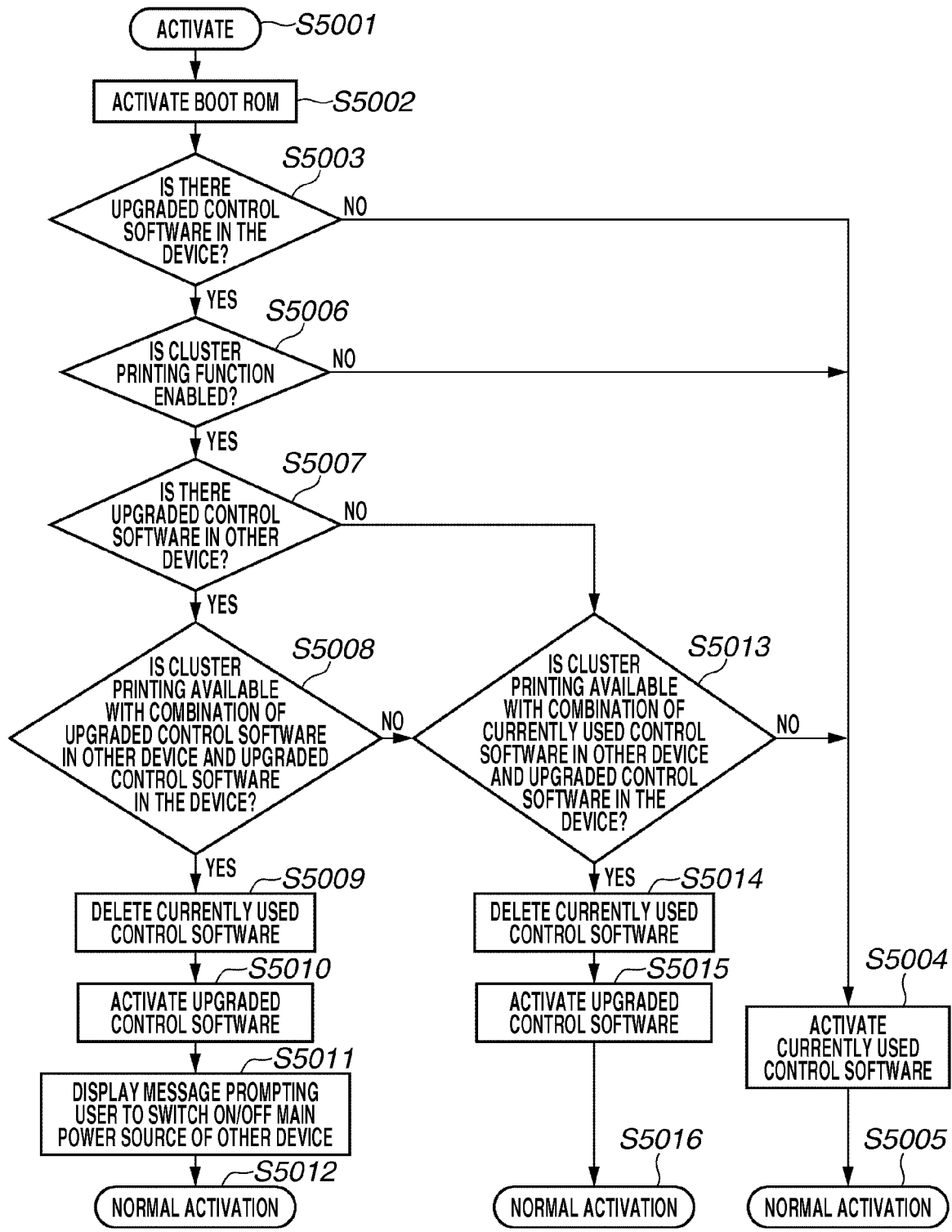
FIG. 5 is a flowchart of an example of a control operation performed by a control unit in the image forming apparatus when the image forming apparatus is activated according to an exemplary embodiment of the present invention.

FIG. 5 is a flowchart illustrating an example of a control procedure performed by the CPU 1 in the control unit 15 according to the present exemplary embodiment. The flowchart describes an example of a process performed when the control unit 15 is switched on.

In step S5001, the control unit 15 is switched on and activated.

In step S5002, the CPU 1 in the control unit 15 activates the boot program 31 from the boot ROM 3.

In step S5003, the CPU 1 executing the boot program 31 in the image forming apparatus 1000 determines whether there is upgraded control software in the HDD 400 of the image forming apparatus 1000. For example, the CPU 1 may determine whether there is the upgraded control software version 1.1 (420) in the image forming apparatus 1000. If the CPU 1 determines there is upgraded control software (YES in step S5003), the process proceeds to step S5006. On the other hand, if the CPU 1 determines there is no upgraded control software (NO in step S5003), the process proceeds to step S5004.

In step S5004, the CPU 1 activates the boot program of the currently used control software version 1.0 (410). It may also be possible that the currently used control program for the image forming apparatus 1000 is activated, and an upgraded control program for the image forming apparatus 1001 is activated.

In step S5005, the CPU 1 executes the currently used control software version 1.0 (410).

In step S5006, the CPU 1 determines whether the cluster printing function is enabled based on the cluster printing function ON/OFF information 81 in the non-volatile RAM 80. If the CPU 1 determines that the cluster printing function is enabled (YES in step S5006), the process proceeds to step S5007. If the CPU 1 determines that the cluster printing function is not enabled (NO in step S5006), the process proceeds to step S5004. In step S5004, the CPU 1 activates the currently used control software version 1.0 (410) in the HDD 400.

In step S5007, the CPU 1 determines whether there is upgraded control software in the HDD 400 of the image forming apparatus 1001 (i.e., the "other device"). For example, the CPU 1 determines whether there is the upgraded control software version 1.1 (420) in the image forming apparatus 1001. If the CPU 1 determines there is upgraded control software in the image forming apparatus 1001 (YES in step S5007), the process proceeds to step S5008. On the other hand, if the CPU 1 determines there is no upgraded control software (NO in step S5007), the process proceeds to step S5013.

In step S5008, the CPU 1 determines whether cluster printing is available with a combination of the upgraded control software in the other device (i.e., the image forming apparatus 1001) according to the version information of upgraded control software in the other device 84 in the non-volatile RAM 80 and the upgraded control software version 1.1 (420) in the HDD 400 of the image forming apparatus 1000. For example, the CPU 1 determines whether cluster printing is available using the management table illustrated in FIG. 11 in the present exemplary embodiment. If the CPU 1 determines that the cluster printing is available with the combination (YES in step S5008), the process proceeds to step S5009. On the other hand, if the CPU 1 determines that the cluster printing is not available (NO in step S5008), the process proceeds to step S5013.

In step S5009, since the cluster printing mode is not affected even if the currently used control software version 1.0 (410) is not used after being upgraded, the CPU 1 deletes the currently used control software version 1.0 (410) in the HDD 400 of the image forming apparatus 1000. The process then proceeds to step S5010.

In step S5010, the boot program 31 normally activates the upgraded control software version 1.1 (420) in the HDD 400 of the image forming apparatus 1000, and the process proceeds to step S5011. At this time, the CPU 1 can display a message such as "switch OFF/ON main power of the device to enable cluster printing function" on the operation unit 650 as illustrated in the example shown in FIG. 10 to prompt the user to upgrade the control software.

In step S5011, only the image forming apparatus 1000 is activated by the upgraded control software, and the other image forming apparatus 1001 is activated by the currently used control software 410. As a result, it can occur that the cluster printing function may become unusable as it is. Therefore, the CPU 1 may display "switch OFF/ON main power of 192.168.0.101 (i.e., IP address of the other device) to enable cluster printing function" on the operation unit 650 as illustrated in the example shown in FIG. 6 to prompt the user to upgrade the control software in the other device. The process then proceeds to step S5012.

In step S5012, the boot program 31 in the image forming apparatus 1001 normally activates the upgraded control software version 1.1 (420) in the HDD 400.

In step S5013, the CPU 1 determines whether cluster printing is available with a combination of currently used control software in the image forming apparatus 1001 according to the version information of the control software currently used in the other device 83, and the upgraded control software in the HDD 400 of the image forming apparatus 1000. For example, the CPU 1 may determine whether cluster printing is available using the management table as illustrated in the example shown in FIG. 11, to be described below, according to the present exemplary embodiment.

If the CPU 1 determines that cluster printing is available with the above-described combination (YES in step S5013), the process proceeds to step S5014. On the other hand, if the CPU 1 determines that cluster printing is not available with the above-described combination (NO in step S5013), the process proceeds to step S5004, where the currently used control software is activated, and normal activation then proceeds in step S5005.

In step S5014, since the cluster printing mode is not affected even if the currently used control software version 1.0 (410) is not used after being upgraded, the CPU 1 deletes the currently used control software version 1.0 (410) in the HDD 400 of the image forming apparatus 1000. The process then proceeds to step S5015.

In step S5015, the boot program 31 activates the upgraded control software version 1.1 (420) in the HDD 400 of the image forming apparatus 1000. In step S5016, the boot program 31 in the image forming apparatus 1000 normally activates the upgraded control software version 1.1 (420) in the HDD 400.

Figure 6:
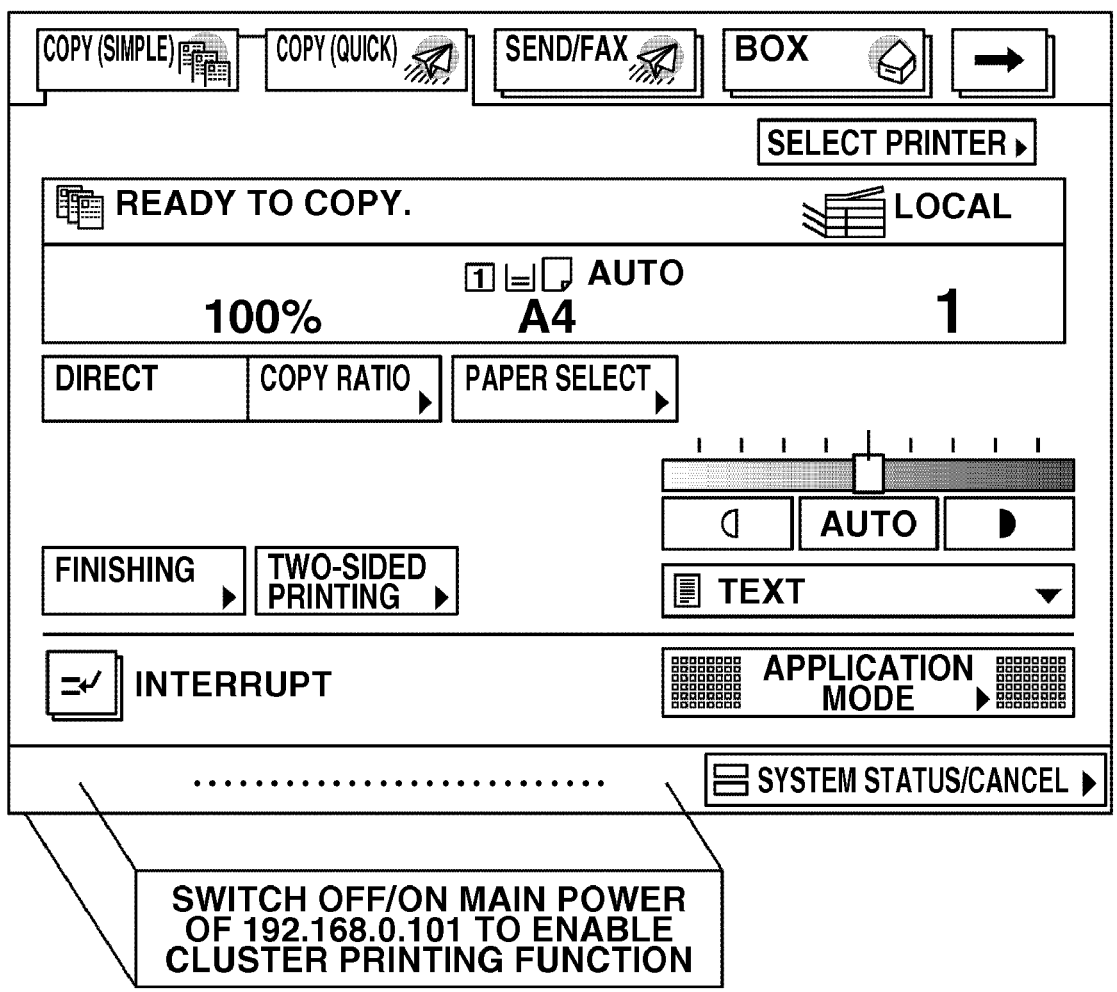
FIG. 6 illustrates an example of a screen displayed in step S5014 of the flowchart illustrated in FIG. 5, on the touch panel input device on the operation unit of the image forming apparatus according to an exemplary embodiment of the present invention.

FIG. 6 illustrates an example of a screen that may be displayed on the touch panel input device 600 on the operation unit 650 of the image forming apparatus 1000 by the process performed in step S5011. The message displayed on the screen illustrated in the example shown in FIG. 6 prompts the user to switch off/on the main power of the other device and immediately upgrade the control software of the other device. The message is displayed on the lower left side of the screen on the operation unit 650, which is a user interface that allows the user to use functions other than the cluster printing function by pressing the other buttons.

Figure 10:
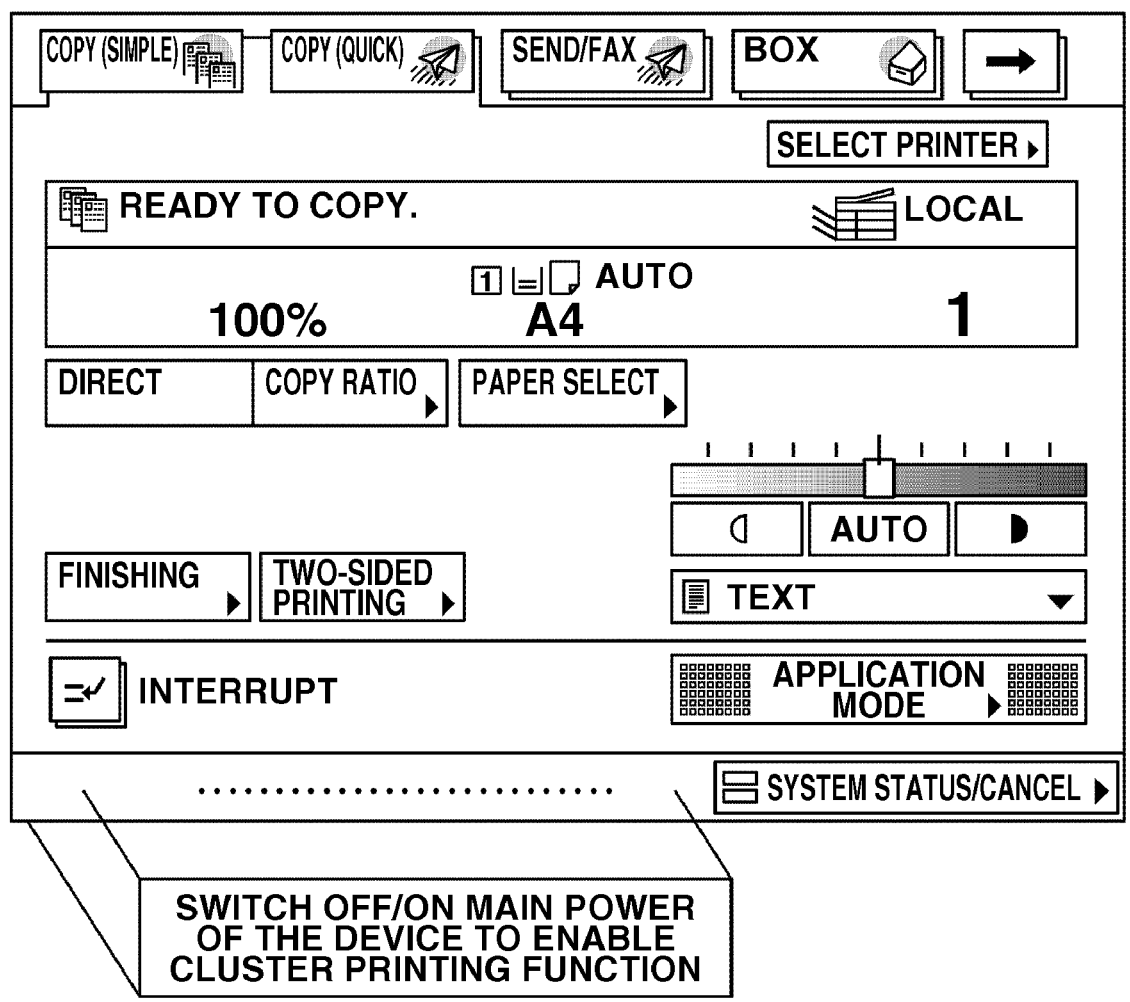
FIG. 10 illustrates an example of a screen displayed on the touch panel input device on the operation unit of the image forming apparatus according to an exemplary embodiment of the present invention.

Similar to FIG. 6, FIG. 10 illustrates an example of a screen that may be displayed on the touch panel input device 600 on the operation unit 650 of the image forming apparatus 1000 by the process performed in step S5010. The message displayed on the screen illustrated in the example shown in FIG. 10 prompts the user to switch off/on the main power of the device. The message is displayed on the lower left side of the screen on the operation unit 650, which is a user interface that allows the user to use functions other than the cluster printing function by pressing the other buttons.

In a second exemplary embodiment of the present invention, control programs stored in the HDD 400 in the hardware configuration of the first exemplary embodiment are changed, so that a process may be performed as described below.

Figure 7:
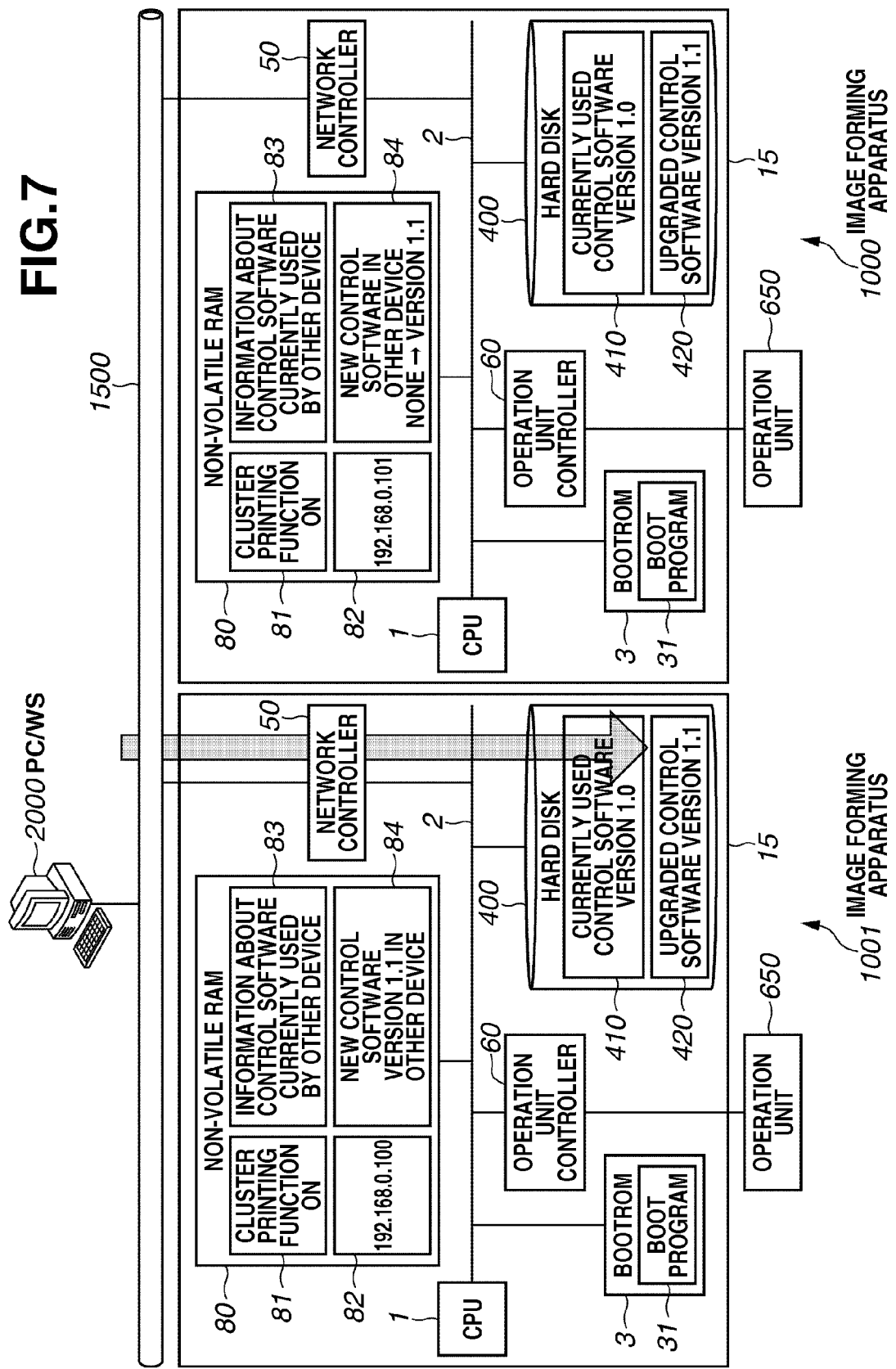
FIG. 7 illustrates an example of an upgrading process performed in the image forming apparatus according to an exemplary embodiment of the present invention.
Figure 8:
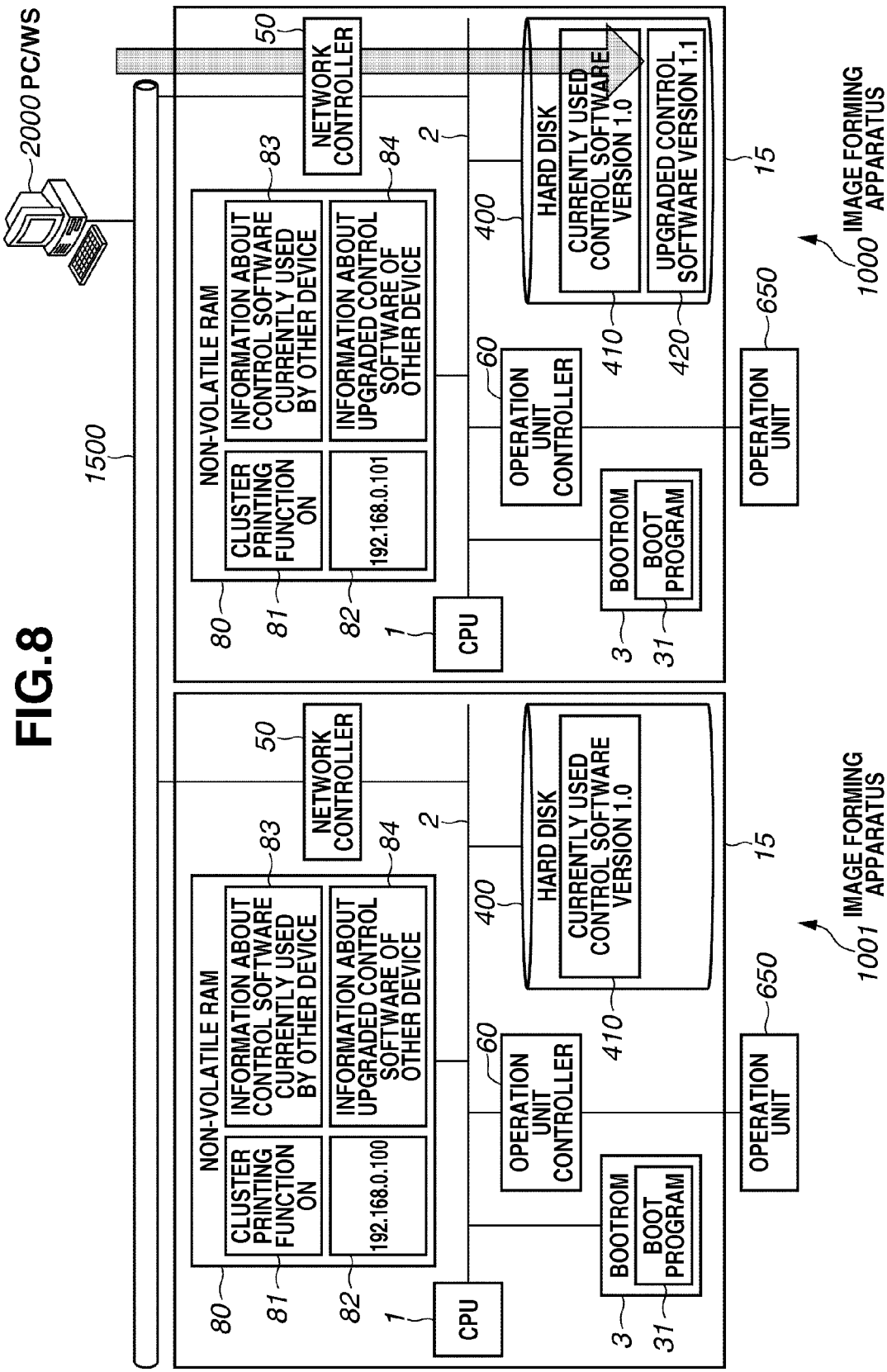
FIG. 8 illustrates an example of an upgrading process performed in the image forming apparatus according to an exemplary embodiment of the present invention.
Figure 9:
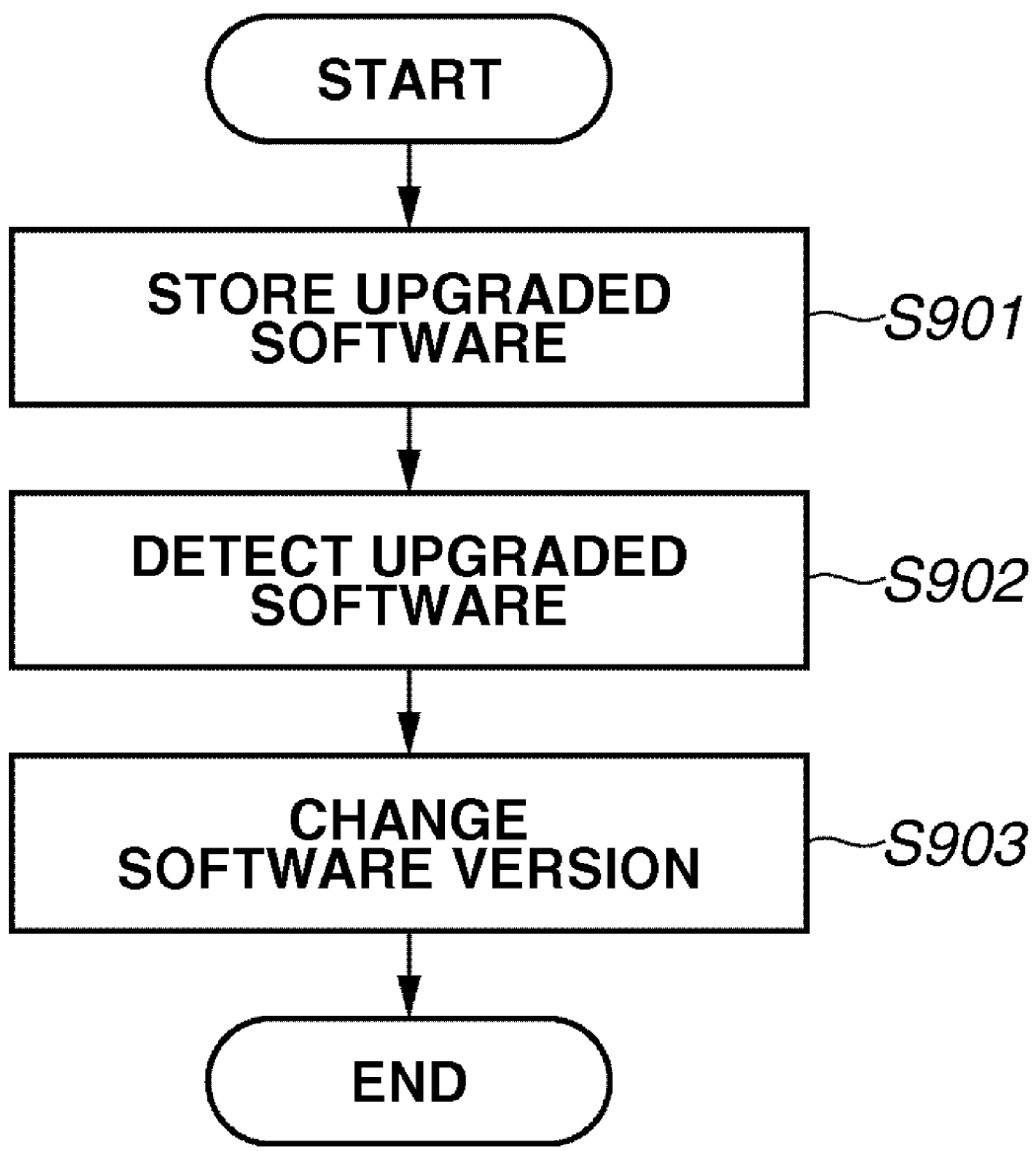
FIG. 9 is a flowchart illustrating an example of an upgrading process performed in the image forming apparatus according to an exemplary embodiment of the present invention.

FIGS. 7 and 8 illustrate examples of an upgrading process according to the present exemplary embodiment, and FIG. 9 is a flowchart illustrating an example of the upgrading process performed as illustrated in FIGS. 7 and 8.

Referring to the example shown in FIG. 7, the upgraded control software version 1.1 is transferred from the PC/WS 2000 to the HDD 400 of the image forming apparatus 1001. The process corresponds to the process performed in step S901 illustrated in the flowchart of FIG. 9.

Referring to the example shown in FIG. 9, in step S901, the upgraded control software version 1.1 is transferred from the PC/WS 2000 to the image forming apparatus 1001. Software can also be supplied from a storage medium such as one or more of a floppy disk, hard disk, optical disk, compact disc (CD)-ROM, CD-readable (R), digital versatile disc (DVD)-ROM, magnetic tape, non-volatile memory card, and a ROM.

In step S902, the image forming apparatus 1000 detects that there is the upgraded control software version 1.1 in the HDD 400 of the image forming apparatus 1001 via a regular polling.

In step S903, the CPU 1 in the image forming apparatus 1000 overwrites the version information of the upgraded control software of the other device 84 from none to version 1.1. Further, the CPU 1 can display a message on the operation unit 650 as illustrated in FIG. 10, i.e., "switch OFF/ON main power source of the device to enable cluster printing function", to prompt the user.

An example of a process performed by the control unit 15 in the image forming apparatus 1000 when the main power of the image forming apparatus 1000 is switched off/on in FIG. 7 will be described below with reference to the flowchart illustrated in FIG. 5.

Similar to the first exemplary embodiment, steps S5001 and S5002 are performed. In step S5003, the CPU 1 determines whether there is upgraded control software in the image forming apparatus 1000. Referring to FIG. 7, the upgraded control software version 1.1 (420) exists in the image forming apparatus 1000 according to the present exemplary embodiment (YES in step S5003), so that the process proceeds to step S5006. In step S5006, the CPU 1 determines that the cluster printing function is enabled (YES in step S5006). The process thus proceeds to step S5007.

In step S5007, since the upgraded control software version 1.1 (420) exists in the image forming apparatus 1001 according to the present exemplary embodiment (YES in step S5007), the process proceeds to step S5008.

In step S5008, since the upgraded control software in the other device (i.e., the image forming apparatus 1001) is version 1.1 and the upgraded control software in the HDD 400 of the image forming apparatus 1000 is version 1.1, cluster printing is available with the combination (YES in step S5008). The process thus proceeds to step S5009.

In step S5009, since the cluster printing mode is not affected even if the currently used control software version 1.0 (410) is not used after being upgraded, the CPU 1 deletes the currently used control software version 1.0 (410) in the HDD 400 of the image forming apparatus 1000. The process then proceeds to step S5010.

In step S5010, the boot program 31 of the image forming apparatus 1000 activates the upgraded control software version 1.1 (420) in the HDD 400. The process then proceeds to step S5011.

In step S5011, only the image forming apparatus 1000 is activated by the upgraded control software, and the image forming apparatus 1001 is activated by the currently used control software 410. As a result, it can occur that the cluster printing function may become unusable as is. Therefore, the CPU 1 may display "switch OFF/ON main power of 192.168.0.101 to enable cluster printing function" on the operation unit 650 as illustrated in the example shown in FIG. 6 to prompt the user to upgrade the control software in the other device (image forming apparatus 1001). The process then proceeds to step S5012.

The boot program 31 in the image forming apparatus 1001 may also activate the upgraded control software version 1.1 (420) in the HDD 400. The process then proceeds to step S5012, and the upgraded control software is thus normally activated.

In the example illustrated in FIG. 8, the currently used control software version 1.0 (410) is operating in the HDD 400 of the control unit 15 in each of the image forming apparatus 1000 and the image forming apparatus 1001. Since the control software is version 1.0 (410) in both apparatuses, cluster printing is available. However, there is no upgraded control software in the image forming apparatus 1001. An upgrading process in the above-described example will be described below with reference to the flowchart illustrated in FIG. 9.

In step S901, the upgraded control software version 1.1 (420) is transferred from the PC/WS 2000 to the HDD 400 in the image forming apparatus 1000.

In step S902, the image forming apparatus 1001 determines there is the upgraded control software version 1.1 (420) in the HDD 400 of the image forming apparatus 1000 via a regular polling.

In step S903, the CPU 1 in the image forming apparatus 1001 overwrites the information about the upgraded control software in other device 84 from none to version 1.1. Further, the CPU 1 can display a message such as "switch OFF/ON main power of the device to enable cluster printing function" on the operation unit 650 as illustrated in the example shown in FIG. 10 to prompt the user.

An example of a process performed by the control unit 15 of the image forming apparatus 1000 when the user switches off/on the main power of the image forming apparatus 1000 will be described below with reference to the flowchart illustrated in FIG. 5.

The process proceeds from step S5001 to step S5002 similarly as the first exemplary embodiment. In step S5003, the CPU 1 executing the boot program 31 determines whether there is the upgraded control software in the HDD 400 of the image forming apparatus 1000. Referring to the example shown in FIG. 8, there is the upgraded control software version 1.1 (420) in the image forming apparatus 1000. The process thus proceeds to step S5006.

In step S5006, since the cluster printing function is enabled in the example illustrated in FIG. 8 according to the present exemplary embodiment (YES in step S5006), the process proceeds to step S5007.

In step S5007, since there is no upgraded software in the other device (image forming apparatus 1001), the process proceeds to step S5013.

In step S5013, the image forming apparatus 1000 includes the upgraded control software version 1.1, and the image forming apparatus 1001 stores the currently used control software version 1.0. According to the present exemplary embodiment, cluster printing is not available with such a combination (NO in step S5013). Therefore, the process proceeds to step S5005 via step S5004. Referring to the example shown in FIG. 8, the image forming apparatus 1000 thus activates the currently used control software version 1.0 (410) in the HDD 400.

In the present exemplary embodiment, cluster printing is not available with the combination of control software versions 1.1 and 1.0. However, if cluster printing is available with such a combination (YES in step S5013), the process proceeds to step S5014 and then to step S5015. Referring to the example shown in FIG. 8, the image forming apparatus 1000 may thus activate the upgraded control software version 1.1 (420) in the HDD 400.

In a third exemplary embodiment of the present invention, the image forming apparatus operates as described below when control programs stored in the HDD 400 in the hardware configuration of the first exemplary embodiment are changed.

Figure 12:
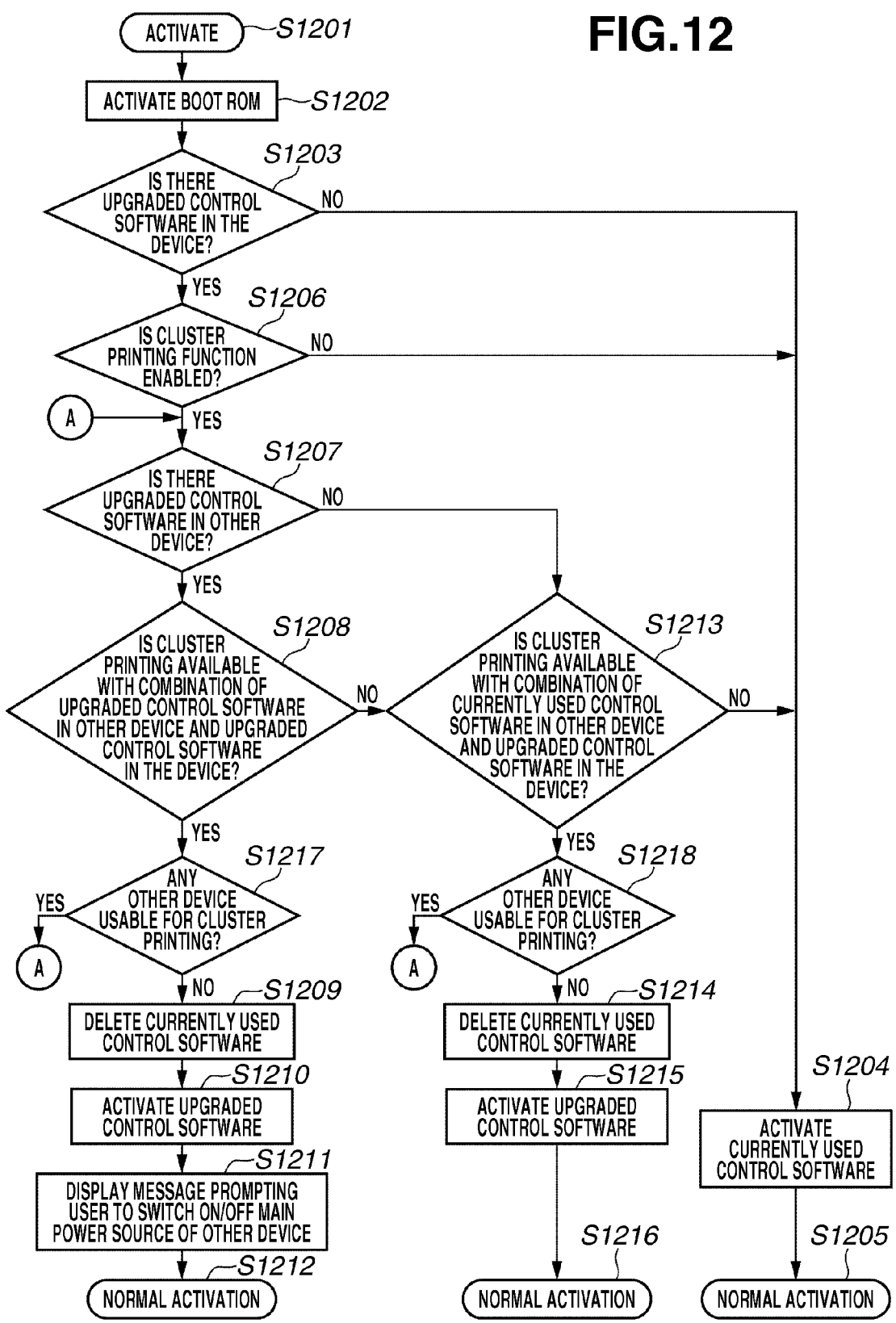
FIG. 12 is a flowchart illustrating an example of a control operation performed by the control unit in the image forming apparatus, in a case where a plurality of devices to be set in a cluster printing mode can be selected, and the devices are not upgraded unless all the devices that are set can be upgraded, according to an exemplary embodiment of the present invention.

FIG. 12 is a flowchart illustrating an example of a process performed when a cluster printing mode can be set with three or more image forming apparatuses. When the cluster printing mode can be set to three or more devices, whether the cluster printing mode can be set is determined for each device. As a result, devices to which the cluster printing mode can be set are upgraded and normally activated.

In such a case, upgrading can be performed when all devices to which the cluster printing mode can be set can be upgraded, or by upgrading only the devices to which the cluster printing mode can be set. Further, devices in which the cluster printing mode can be set can be selected and upgraded.

The flowchart illustrated in FIG. 12 describes a case where the cluster printing mode can be set to, for example, three or more devices, and the control software is upgraded when all of the devices to which the cluster printing mode can be set can be upgraded.

In step S1201, the user switches on the control unit 15 of the image forming apparatus 1000 and activates the control unit 15.

In step S1202, the CPU 1 in the control unit 15 activates the boot program 31 from the boot ROM 3.

In step S1203, the CPU 1 determines whether there is upgraded control software in the image forming apparatus 1000. In the present exemplary embodiment, there is upgraded control software in the image forming apparatus 1000 (hereinafter referred to as the device) (YES in step S1203). The process thus proceeds to step S1206. If it were determined that there was not upgraded control software in the image forming apparatus 1000 (NO in step S1203), then the process would proceed to step S1204, which is described below.

In step S1206, the CPU 1 determines that the cluster printing function is enabled (YES in step S1206). The process thus proceeds to step S1207. If it were determined that the cluster printing function were not enabled (NO in step S1206), then the process would proceed to step S1204, which is described below.

In step S1207, the CPU 1 determines there is upgraded control software in the image forming apparatus 1001 (hereinafter referred to as the other device) according to the present exemplary embodiment (YES in step S1207). The process then proceeds to step S1208. If it were determined that there was not upgraded control software in the image forming apparatus 1001 (NO in step S1207), then the process would proceed to step S1213, which is described below.

In step S1208, the CPU 1 determines whether cluster printing is available with the combination of the upgraded control software in the other device and the upgraded control software in the device. If the CPU 1 determines that cluster printing is available with such a combination (YES in step S1208), the process proceeds to step S1217. On the other hand, if cluster printing is not available with such a combination, (NO in step S1208), the process proceeds to step S1213. In step S1213, if the CPU 1 determines that cluster printing is available with the combination of the upgraded control software in the device and the currently used control software in the other device (YES in step S1213), the process proceeds to step S1218.

In step S1217 or step S1218, the CPU 1 determines whether there is another device usable for cluster printing. If the CPU 1 determines that there is another device usable for cluster printing (YES in step S1217 or YES in step S1218), the process returns to step S1207. On the other hand, if there is no other device that is usable for cluster printing (NO in step S1217 or NO in step S1218), the process proceeds from step S1217 to step S1209, or from step S1218 to step S1214.

On the other hand, in step S1213, if the CPU 1 determines that cluster printing is not available with a combination of currently used software of even one device among devices that is usable for cluster printing, and the upgraded control software in the image forming apparatus 1000 (NO in step S1213), the process proceeds to step S1204. As a result, the currently used control software is activated in the image forming apparatus 1000, with normal activation thereof in step S1205.

In step S1209 or step S1214, since the cluster printing mode is not affected even if the currently used control software is not used after being upgraded, the currently used control software is deleted. The process then proceeds from step S1209 to step S1210, or from step S1214 to step S1215.

In step S1210, the boot program 31 in the image forming apparatus 1000 activates the upgraded control software in the HDD 400. The process then proceeds to step S1211. Similarly, in step S1215, the boot program 31 in the image forming apparatus 1000 activates the upgraded control software in the HDD 400. The process proceeds to step S1216, and the upgrading of the image forming apparatus 1000 is completed.

Referring to step S1210, only the image forming apparatus 1000 is activated by the upgraded control software, and the other devices are activated by the currently used control software. Therefore, it can occur that the cluster printing function may become unusable as is.

To solve such a problem, in step S1211, the CPU 1 displays "switch OFF/ON main power of 192.168.0.101 to enable cluster printing function" on the operation unit 650 as illustrated in the example shown in FIG. 6, to prompt the user to immediately upgrade the control software of the other device. The process then proceeds to step S1212, and the upgraded software is normally activated.

Further, the boot program 31 of the image forming apparatus 1001 activates the upgraded control software in the HDD 400. The image forming apparatus 1001 is thus normally activated.

In a fourth exemplary embodiment of the present invention, the image forming apparatus operates as described below when control programs stored in the HDD 400 in the hardware configuration of the first exemplary embodiment are changed.

Figure 13:
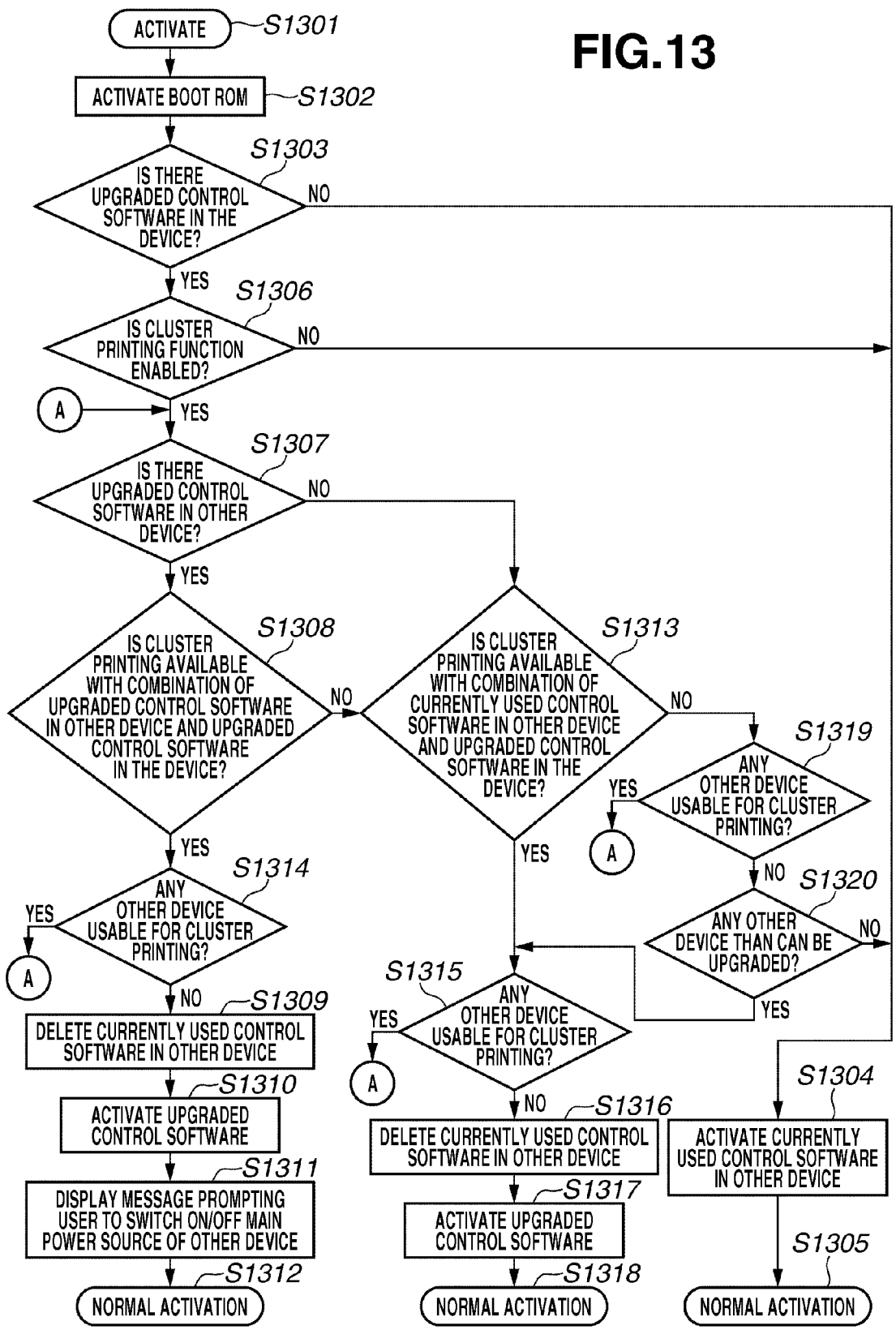
FIG. 13 is a flowchart illustrating an example of a control operation performed by the control unit in the image forming apparatus, in a case where a plurality of devices to be set in a cluster printing mode can be selected, and the devices are upgraded when a part of the devices that are set can be upgraded, according to an exemplary embodiment of the present invention.

FIG. 13 is a flowchart illustrating an example of a process in which a cluster printing mode can be set with three or more devices and in which the devices are upgraded when a part of the devices can be upgraded.

In step S1301, the user switches on the control unit 15 and activates the control unit 15.

In step S1302, the CPU 1 in the control unit 15 activates the boot program 31 from the boot ROM 3.

In step S1303, the CPU 1 determines whether there is upgraded control software in the image forming apparatus 1000. In the present exemplary embodiment, there is upgraded control software in the image forming apparatus 1000 (hereinafter referred to as the device) (YES in step S1303). The process thus proceeds to step S1306. If there were not upgraded control software in the image forming apparatus 1000 (NO in step S1303), then the process would proceed to step S1304, which is described below.

In step S1306, the CPU 1 determines that the cluster printing function is enabled (YES in step S1306). The process proceeds to step S1307. If the CPU were to determine that the cluster printing function were not enabled (NO in step S1306), then the process would proceed to step S1304. In step S1304, the currently used control software in the other device is activated, and normal activation proceeds in step S1305.

In step S1307, the CPU 1 determines there is upgraded control software in the image forming apparatus 1001 (hereinafter referred to as the other device) (YES in step S1307) in the present exemplary embodiment. The process then proceeds to step S1308. If the CPU were to determine that there is not any upgraded control software in the image forming apparatus 1001 (NO in step S1307), then the process would proceed to step S1313, which is described below.

In step S1308, the CPU 1 determines whether cluster printing is available with a combination of the upgraded control software in the selected image forming apparatuses. If the CPU 1 determines that cluster printing is available with the combination of the upgraded control software in the other device and the upgraded control software in the device (YES in step S1308), the process proceeds to step S1314. On the other hand, if cluster printing is not available with the combination (NO in step S1308), the process proceeds to step S1313. In step S1313, if the CPU 1 determines that cluster printing is available with the combination of the upgraded control software in the device and the currently used control software in the other device (YES in step S1313), the process proceeds to step S1315. If the CPU 1 determines that cluster printing is not available with the combination of the upgraded control software in the device and the currently used control software in the other device (NO in step S1313), then the process proceeds to step S1319, which is described below.

In step S1314 or step S1315, the CPU 1 determines whether there is another device usable for cluster printing. If the CPU 1 determines that there is another device usable for cluster printing (YES in step S1314 or in step S1315), the process returns to step S1307. On the other hand, if there is no other device usable for cluster printing (NO in step S1314 or in step S1315), the process proceeds from step S1314 to step S1309, or from step S1315 to step S1316.

In step S1319, the CPU 1 determines whether there is another device usable for cluster printing, after the CPU 1 determines in step S1313 that cluster printing is not available with the combination of the upgraded control software in the device and the currently used control software in the other device. If the CPU 1 determines there is no other device usable for cluster printing (NO in step S1319), the process proceeds to step S1320. If the CPU 1 determines that there is another device usable for cluster printing (YES in step S1319), the process returns to step S1307.

In step S1320, the CPU 1 determines whether there is another device that can be upgraded. If the CPU 1 determines there is no other device that can be upgraded (NO in step S1320), the process proceeds to step S1304, which is described below. On the other hand, if the CPU 1 determines there is a device that can be upgraded (YES in step S1320), the process proceeds to step S1315.

In step S1309 or step S1316, since the cluster printing mode is not affected even if the currently used control software is not used after being upgraded, the currently used control software is deleted. The process then proceeds from step S1309 to step S1310, or from step S1316 to step S1317.

In step S1310, the boot program 31 in the device activates the upgraded control software in the HDD 400. The process then proceeds to step S1311. Further, in step S1317, the boot program 31 in the device activates the upgraded control software in the HDD 400. The process proceeds to step S1318, and the device is normally activated.

In step S1310, only the device is activated by the upgraded control software, and the other device is activated by the currently used control software. Therefore, it can occur that the cluster printing function may become unusable as is.

To solve such a problem, in step S1311, the CPU 1 may display "switch OFF/ON main power of 192.168.0.101 to enable cluster printing function" on the operation unit 650 as illustrated in the example shown in FIG. 6, to prompt the user to immediately upgrade the control software in the other device. The process then proceeds to step S1312.

As a result, the boot program 31 of the image forming apparatus 1001 activates the upgraded control software in the HDD 400, and the process proceeds to step S1312, in which the image forming apparatus 1001 is normally activated.

In a fifth exemplary embodiment of the present invention, the image forming apparatus operates as described below when control programs stored in the HDD 400 in the hardware configuration of the first exemplary embodiment are changed.

Figure 14:
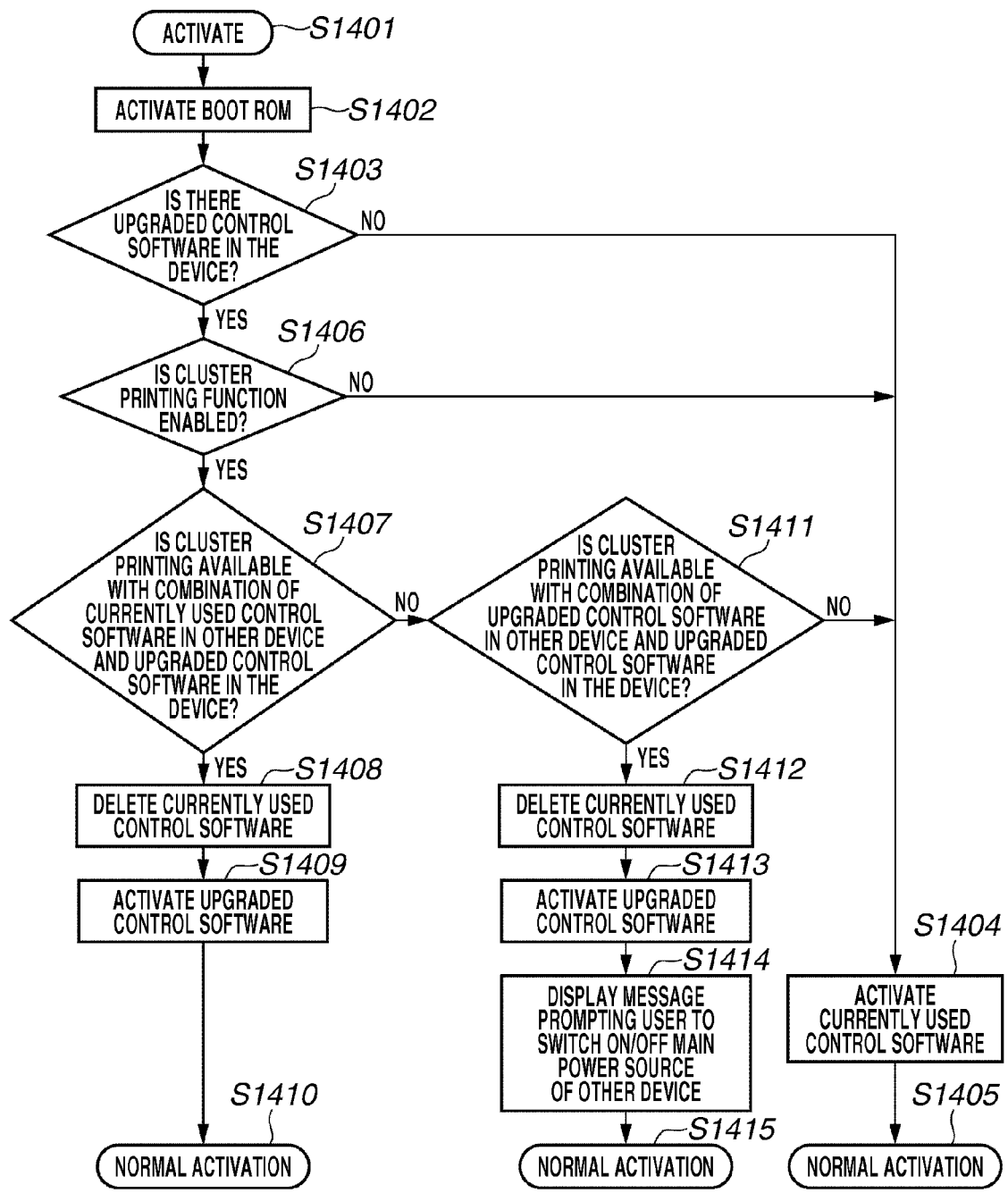
FIG. 14 is a flowchart illustrating another example of a method of control performed by the control unit in the image forming apparatus according to an exemplary embodiment of the present invention.

FIG. 14 is a flowchart illustrating an example of a control procedure performed by the CPU 1 in the control unit 15 when the control unit 15 is switched on according to the present exemplary embodiment In step S1401, the control unit 15 is switched on and activated. In step S1402, the CPU 1 in the control unit 15 activates the boot program 31 from the boot ROM 3.

In step S1403, the CPU 1 executing the boot program 31 of the image forming apparatus 1000 (hereinafter referred to as the device) determines whether there is upgraded control software in the HDD 400 of the device. For example, the CPU 1 may determine whether there is the upgraded control software version 1.1 (420) in the HDD 400. In a case where the CPU 1 determines there is upgraded software in the device (YES in step S1403), the process proceeds to step S1406. On the other hand, in a case where the CPU 1 determines there is no upgraded software in the device (NO in step S1403), the process proceeds to step S1404.

In step S1404, since the CPU 1 determined there was no upgraded control software in the HDD 400 in step S1403, the CPU 1 activates the boot program of the currently used control software. The process then proceeds to step S1405, and the CPU 1 executes the currently used control software.

In step S1406, since the CPU 1 determines that there is the upgraded software in the HDD 400 of the device in step S1403, the CPU 1 determines whether the cluster printing function is enabled, based on the cluster printing function ON/OFF information 81 in the non-volatile RAM 80. If the CPU 1 determines that the cluster printing function is enabled (YES in step S1406), the process proceeds to step S1407. On the other hand, if the CPU 1 determines that the cluster printing function is not enabled (NO in step S1406), the process proceeds to step S1404. In step S1404, the boot program 31 activates the currently used software in the HDD 400.

In step S1407, the CPU 1 determines whether cluster printing is available with the combination of the currently used control software in the other device according to the version information of the currently used control software in other device 83 in the non-volatile RAM 80, and the upgraded control software in the HDD 400 of the device. For example, in the present exemplary embodiment, the CPU 1 may not directly determine whether there is upgraded control software in the HDD 400 of the image forming apparatus 1001 (hereinafter referred to as the other device). The determination in step S1407 may be based on a management table as illustrated in the example show in FIG. 11. If cluster printing is available with the combination (YES in step S1407), the process proceeds to step S1408. If cluster printing is not available with the combination (NO in step S1407), the process proceeds to step S1411.

In step S1407, the CPU 1 determines that cluster printing is available with the combination of the currently used software in the other device and the upgraded control software in the device. Therefore, in step S1408, the currently used software in the HDD 400 of the device, which does not affect the cluster printing mode if not used after an upgrade, is deleted. The process then proceeds to step S1409.

In step S1409, the boot program in the device activates the upgraded control software 420 in the HDD 400. The process then proceeds to step S1410, and the upgraded control software 420 is normally activated.

In step S1411, the CPU 1 determines whether cluster printing is available with a combination of the upgraded software in the other device according to the version information of upgraded control software in the other device 84, and upgraded control software in the HDD 400 of the device. The determination may also use a management table such as for example that illustrated in FIG. 11. If the CPU 1 determines that cluster printing is available with the combination (YES in step S1411), the process proceeds to step S1412. On the other hand, if the CPU 1 determines that cluster printing is not available with the combination (NO in step S1411), the process proceeds to step S1404.

In step S1411, it is determined that cluster printing is available with the combination of the upgraded software in the other device and the upgraded control software in HDD 400 of the device. Therefore, in step S1412, the currently used software in the HDD 400 of the device, which does not affect the cluster printing mode if not used after an upgrade, may be deleted. The process then proceeds to step S1413.

In step S1413, the boot program 31 normally activates the upgraded control software in the HDD 400 of the device. The process then proceeds to step S1414. A message such as "switch OFF/ON the main power of the device to enable cluster printing function" can be displayed on the operation unit 650 as illustrated in the example of FIG. 10 to prompt the user.

In step S1414, since only the device is activated by the upgraded software and the other device is activated by the currently used software, it can occur that the cluster printing function may become unusable as is. TO solve such a problem, a message such as "switch OFF/ON the main power of 192.168.0.101 to enable cluster printing function" may be displayed to prompt the user. The process then proceeds to step S1415.

In step S1415, the boot program 31 of the other device normally activates the upgraded control software in the HDD 400.

According to one embodiment, aspects of the present invention can also be achieved by providing a storage medium which stores software (program code) for implementing functions of the above-described exemplary embodiments (e.g., flowcharts illustrated in FIGS. 5, 12, 13, and 14) to a system or an apparatus. The software (e.g., computer-executable instructions and/or program code) stored in the computer-readable storage medium can be read and executed by a computer (central processing unit (CPU) or micro-processing unit (MPU)) of the system or the apparatus.

In this case, the computer-readable medium having the software (i.e. program code and/or computer executable instructions) may itself realize the functions of the above-described exemplary embodiments (e.g., flowcharts illustrated in FIGS. 5, 12, 13, and 14). The computer-readable storage medium itself may thus constitute an aspect according to the present invention.

The storage medium can be, for example, at least one of a floppy disk, a hard disk, an optical disk, a magneto-optical disk, a compact disc-read-only memory (CD-ROM), a CD-recordable (CD-R), a CD-rewritable (CD-RW), a digital versatile disc (DVD)-ROM, a magnetic tape, a nonvolatile memory card, and a ROM.

According to aspects of the above-described exemplary embodiments, one job may be output using a plurality of devices. However, aspects of the present invention may also be applied to a case where there is a plurality of jobs, or when a job is input from one device and printed by other devices in which the cluster printing mode is set. Further, while a print job is described in the above-described exemplary embodiments, aspects of the present invention can also be applied to copying, including copying electronic data.

According to aspects of the exemplary embodiments, conformity between versions of control software may be compared as described above in an image forming apparatus that realizes a function using a plurality of devices (e.g., such as cluster printing). As a result, the number of cases where such a function cannot be used due to a mismatch in a combination of control software of the devices can be reduced.

Further, according to another aspect of the present invention, a plurality of control programs can be stored in a device. Therefore, versions of control software in a device and another device can be compared by first comparing upgraded software in a device and upgraded software in the other device. If it is determined that upgrading cannot be performed, the upgraded software in the device and currently used software in the other device are then compared. If it is further determined that upgrading cannot be performed, then upgrading is not performed. As a result, the number of cases where such a function cannot be used due to an inconformity in a combination between control software of devices is reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-050129 filed Feb. 29, 2008, which is hereby incorporated by reference herein in its entirety.

What is claimed is:

1. An image forming apparatus to which a composite service that causes a plurality of devices to collaborate is set, a currently used control program and an upgraded control program being stored in the image forming apparatus, wherein each of the plurality of devices stores a currently used control program and an upgraded control program, the image forming apparatus comprising:
   a first determination unit configured to determine whether the composite service is available with a combination of the upgraded control program for the image forming apparatus and an upgraded control program for a device of the plurality of devices;
   a second determination unit configured to determine whether the composite service is available with a combination of the upgraded control program for the image forming apparatus and a currently used control program for the device; and
   an activation unit configured to activate the upgraded control program for the image forming apparatus without an activation of the currently used control program for the image forming apparatus if the first determination unit or the second determination unit determines that the composite service is available.

2. The image forming apparatus according to claim 1, wherein the composite service causes a plurality of devices to share a job.

3. The image forming apparatus according to claim 1, wherein the first and second determination units determine based on a table including version information about the control program.

4. The image forming apparatus according to claim 1, wherein the activation unit is configured to activate the currently used control program for the image forming apparatus if the first determination unit and the second determination unit determine that the composite service is not available.

5. A method for controlling an image forming apparatus that is usable for a composite service that causes a plurality of devices to collaborate, and stores a currently used control program and an upgraded control program, wherein each of the plurality of devices stores a currently used control program and an upgraded control program, the method comprising:
   in a first determining step, determining whether the composite service is available with a combination of the upgraded control program for the image forming apparatus and an upgraded control program for a device of the plurality of devices;
   in a second determining step, determining whether the composite service is available with a combination of the upgraded control program for the image forming apparatus and a currently used control program for the device; and
   activating the upgraded control program for the image forming apparatus without an activation of the currently used control program for the image forming apparatus if it is determined that the composite service is available in the first or second determining step.

6. A non-transitory computer-readable storage medium storing computer-executable instructions for executing a method for controlling an image forming apparatus that is usable for a composite service that causes a plurality of devices to collaborate, and stores a currently used control program and an upgraded control program, wherein each of the plurality of devices stores a currently used control program and an upgraded control program, the computer-readable storage medium comprising:
   computer-executable instructions for, in a first determining step, determining whether the composite service is available with a combination of the upgraded control program for the image forming apparatus and an upgraded control program for a device of the plurality of devices;
   computer-executable instructions for, in a second determining step, determining whether the composite service is available with a combination of the upgraded control program for the image forming apparatus and a currently used control program for the device; and
   computer-executable instructions for activating the upgraded control program for the image forming apparatus without an activation of the currently used control program for the image forming apparatus if it is determined that the composite service is available in the first or second determining step.

* * * * *